US010585322B2

(12) United States Patent
Gil et al.

(10) Patent No.: US 10,585,322 B2
(45) Date of Patent: Mar. 10, 2020

(54) METHODS FOR PRODUCING ELECTROCHROMIC FILMS BY LOW TEMPERATURE CONDENSATION OF POLYOXOMETALATES

(71) Applicants: THE REGENTS OF THE UNIVERSITY OF CALIFORNIA, Oakland, CA (US); BOARD OF REGENTS, THE UNIVERSITY OF TEXAS SYSTEM, Austin, TX (US)

(72) Inventors: Anna Llordés Gil, Vitoria-Gasteiz (ES); Delia J. Milliron, Austin, TX (US); Gabriel LeBlanc, Austin, TX (US); Yang Wang, Yunnan (CN)

(73) Assignees: THE REGENTS OF THE UNIVERSITY OF CALIFORNIA, Oakland, CA (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 369 days.

(21) Appl. No.: 15/304,177

(22) PCT Filed: Apr. 14, 2015

(86) PCT No.: PCT/US2015/025785
§ 371 (c)(1),
(2) Date: Oct. 14, 2016

(87) PCT Pub. No.: WO2015/160829
PCT Pub. Date: Oct. 22, 2015

(65) Prior Publication Data
US 2017/0031224 A1    Feb. 2, 2017

Related U.S. Application Data

(60) Provisional application No. 61/979,900, filed on Apr. 15, 2014.

(51) Int. Cl.
*B05D 3/10* (2006.01)
*G02F 1/153* (2006.01)
(Continued)

(52) U.S. Cl.
CPC ............... *G02F 1/153* (2013.01); *B05D 1/18* (2013.01); *B05D 3/108* (2013.01); *C01G 33/00* (2013.01);
(Continued)

(58) Field of Classification Search
None
See application file for complete search history.

(56) References Cited

U.S. PATENT DOCUMENTS 5,377,039 A * 12/1994 Babinec ................. G02F 1/155
359/265
2009/0136658 A1* 5/2009 Yoshinaka ............ C07C 51/412
427/126.2

(Continued)

FOREIGN PATENT DOCUMENTS

WO    1991002282 A1    2/1991
WO    2013016318       1/2013

(Continued)

OTHER PUBLICATIONS

Molinari et al. "Tetralkylammonium and Sodium Decatungstate Heterogenized on Silica: Effects of the Nature of Cations on the Photocatalytic Oxidation of Organic Substrates" (2002). Langmuir, 18, pp. 5400-5405 (Year: 2002).*

(Continued)

Primary Examiner — Jose Hernandez-Diaz
(74) Attorney, Agent, or Firm — Womble Bond Dickinson (US) LLP; Daniel E. Ovanezian

(57) ABSTRACT

Described are electrochromic films produced by low temperature condensation of polyoxometalates and applications (Continued)

thereof. A method of producing an electrochromic film includes depositing a polyoxometalate (POM) solution on a substrate to form a POM film. The POM solution includes anionic POM clusters and counter ions, and may be doped with near-infrared plasmonic nanocrystals. The film is chemically cured using an acid to condense the POM clusters within the POM film. Another method of producing an electrochromic film includes electrochemical deposition and condensation of POM clusters.

12 Claims, 11 Drawing Sheets

(51) Int. Cl.
    *C01G 33/00*     (2006.01)
    *G02F 1/15*     (2019.01)
    *B05D 1/18*     (2006.01)
    *G02F 1/155*     (2006.01)
    *C01G 35/00*     (2006.01)
    *C01G 31/02*     (2006.01)
    *G02F 1/1516*     (2019.01)

(52) U.S. Cl.
    CPC .............. *G02F 1/15* (2013.01); *G02F 1/155* (2013.01); *C01G 31/02* (2013.01); *C01G 35/00* (2013.01); *C01P 2002/82* (2013.01); *C01P 2006/40* (2013.01); *C01P 2006/60* (2013.01); *G02F 1/15165* (2019.01); *G02F 2202/36* (2013.01)

(56) References Cited

U.S. PATENT DOCUMENTS

2010/0283040 A1    11/2010    Bendikov et al.
2014/0205748 A1*    7/2014    Choi ................... G02F 1/1523
                                                            427/123

FOREIGN PATENT DOCUMENTS

WO    WO-2013016318 A2 *    1/2013    .............. C09K 9/00
WO    2013032790    3/2013
WO    2013154779    10/2013

OTHER PUBLICATIONS

Llordes et al. "Polyoxometalates and colloidal nanocrystals as building blocks for metal oxide nanocomposite films" (2011). Journal of Material Chemistry, 21, p. 11631 (Year: 2011).*
CAS Registry 126752-51-0 (Year: 2019).*
CAS Registry 12315-57-0 (Year: 2019).*
Cheng et al. Preparation of multilayered nanocomposites of polyoxometalates and poly(amidoamine) dendrimers (2001). Electrochemistry Communications 3, pp. 285-289 (Year: 2001).*
International Search Report and the Written Opinion of the International Searching Authority for PCT Application No. PCT/US2015/025785, dated Apr. 14, 2015, 10 pages.
Cheng, L. et al. (Mar. 5, 2001). "Preparation of Multilayered Nanocomposites of Polyoxometalates and Poly (Amidoamine) Dendrimers" Electrochemistry Communication 3:285-289.
Llordés, A. (Sep. 2016). "Linear Topology in Amorphous Metal Oxide Electrochromic Networks Obtained via Low-Temperature Solution Processing", Nature Material 15:1-10.
International Preliminary Report on Patentability for PCT Application No. PCT/US2015/025785, filed Apr. 14, 2015, 6 pages.

* cited by examiner

US 10,585,322 B2

METHODS FOR PRODUCING ELECTROCHROMIC FILMS BY LOW TEMPERATURE CONDENSATION OF POLYOXOMETALATES

RELATED APPLICATIONS

This application is a U.S. National Stage 371 of PCT International Application No. PCT/US2015/025785, filed Apr. 14, 2015, which claims the benefit of priority to U.S. Provisional Patent Application No. 61/979,900, filed Apr. 15, 2014, which is herein incorporated by reference herein in its entirety.

STATEMENT OF GOVERNMENT RIGHTS

This invention was made with government support under Contract No. DE-AC02-05CH11231 awarded by the U.S. Department of Energy and under Award Nos. DE-AR0000489 and DE-AR0000670 awarded by the Advanced Research Projects Agency-Energy, U.S. Department of Energy. The government has certain rights in the invention.

TECHNICAL FIELD

The present invention relates to the field of electrochromics, and more particularly to electrochromic materials and devices made there from.

BACKGROUND

Electrochromic materials have been suggested for use with energy efficient windows, as these coatings are able to reversibly change their solar transmittance under the application of a small electrical potential. This optical switching property is of great interest for energy-saving "smart window" applications. Based on an electrochemical cell architecture, smart windows can reduce energy consumption in buildings by optimizing solar gain.

Despite the promise of electrochromic materials in smart windows and other applications, current electrochromic technologies in the market have not reached their commercial potential predominately due to high cost and limited performance. One contribution to the high cost is related to the fact that processing electrochromic materials into films is challenging. Commercially available smart window coatings are deposited from a vapor phase using vacuum operated sputtering chambers, which drives up the cost of fabrication.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

Figure 1:
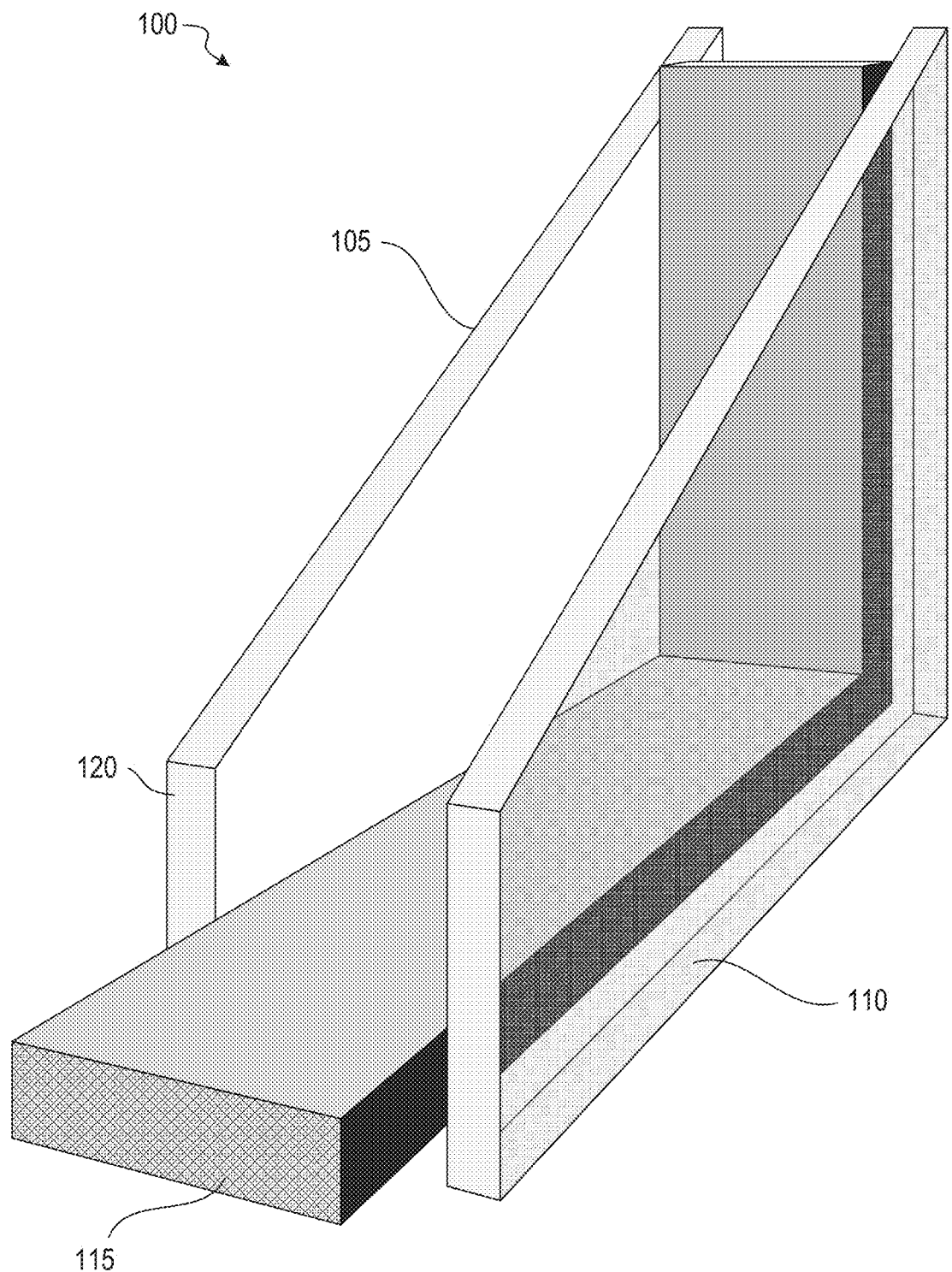
FIG. 1 is a sectioned illustration of a dual pane electrochromic window according to one embodiment.

Described herein are embodiments of a process for producing a networked metal oxide film via low-temperature chemical condensation of polyoxometalates. The process involves the formation of an initial molecular polyoxometalate (POM) film on a transparent substrate by depositing a POM solution thereon. The POM solution contains ionic POM clusters (e.g., in the form of anionic metal-oxo clusters) and counter ions (e.g., organic or inorganic counter ions) dispersed in a solvent. Additional constituents may be included in the POM solution, such as near-infrared (NIR) plasmonic nanocrystals for adjusting electrochromic properties of the resultant POM film (e.g., a "nanocomposite POM film" or "POM-nanocrystal film"). The POM film, or alternatively the POM-nanocrystal film, is then cured in an acidic environment (e.g., using an organic acid solution or vapor). The acidic treatment results in protonation of POM clusters within the film that causes the POM clusters to condense, thus transforming the POM film into a condensed (or networked) film. In another approach, a condensed POM film may be produced by electrochemical deposition and condensation of POM clusters onto the substrate (which may optionally be performed with nanocrystals present). A resultant chemically-condensed film is a hydrated polymeric network (e.g., $NbO_x \cdot nH_2O$, $WO_x \cdot nH_2O$, $VO_x \cdot nH_2O$, etc.) with distinct electrochromic properties, such as higher coloration efficiency and faster optical switching than traditional thermally-condensed films. In some embodiments, to achieve an optimized performance, electrochromic films described herein modulate both visible and near-infrared (NIR) light. This dual-band functionality is exhibited in embodiments herein that include metal oxide nanocomposite films made of plasmonic nanocrystals (e.g., Sn-doped $In_2O_3$) embedded in an amorphous metal oxide matrix (e.g., $NbO_x$).

As used herein, the terms "condensed film", "chemically-condensed film", "condensed POM film", "chemically-condensed electrochromic film", and "condensed electrochromic film" refer to a POM film that has been chemically cured (e.g., by treatment with an acid) or has been electrochemically deposited and condensed (e.g., by application of an electrochemical potential to a substrate immersed in a POM solution). The terms "condensed film", "condensed POM film", and "condensed electrochromic film" refer to such films produced via chemical condensation, unless otherwise stated (such as when referring to a thermally-condensed film).

In some embodiments, the condensed POM film is treated with a water removal agent to extract bound water from within the film, which may improve the performance and lifetime of the film. Also described herein are embodiments of manufacturing a solid-state electrochromic device utilizing a chemically-condensed film. The electrochromic device may be manufactured in a layer-by-layer method using any of the solution processing techniques described herein.

Embodiments described herein may utilize chemical condensation of POM films under ambient conditions, as opposed to vacuum deposition techniques and thermal treatments. Thus, fabrication of an entire electrochromic device can be performed entirely by solution processing at relatively low temperatures. Compared to other fabrication methods, such as sputtering, the solution-based methods described herein are simple, efficient, and cost-effective manufacturing techniques that present low toxicities and are environmentally friendly. In addition to these advantages, a POM-based electrochromic device produced using the techniques described herein may provide the advantages of rapid switching, higher spectral selectivity in the visible range, and greater coloration efficiency compared to current electrochromic devices. These characteristics might be due to differences in the local structure of the chemically-condensed POM film, which permit fast diffusion of charge carriers, such as lithium ions, to produce the electrochromic effect. These aspects may improve the durability, lifetime, and energy-saving performance of electrochromic devices.

The POM-based electrochromic films and devices described herein may be manufactured using standard and inexpensive solution processing techniques at room temperature (RT). These same techniques may also be used to manufacture other layers of the electrochromic device. These electrochromic films and devices incorporate materials that are inexpensive, easy to synthesize and process into devices, and environmentally friendly. In some embodiments, by using materials such as tin-doped indium oxide (ITO) nanocrystals, Poly(ethylene oxide), and a lithium salt such as lithium bis(trifluoromethylsulfonyl)imide (LiTFSI), the present system enables simple solution processability and co-deposition of all three elements into a hybrid POM-nanocomposite film. With these materials, higher coloration efficiency, higher spectral selectivity in the visible range, stronger infrared modulation, faster switching speed (which is the maximum speed at which optical and NIR electromagnetic transmittance of the material can be switched between a maximum transmittance and a minimum transmittance), and longer lifetime can be achieved as compared to traditional electrochromic films and devices.

These POM-based nanocomposite films represent an important step towards realizing a fully solid-state device, with visible- and NIR-selectivity, for dynamic smart windows applications. Future study of nanocrystal sizes and doping levels, nanocrystal morphologies, lithium content, polymer molecular weight, etc., will allow for a greater range of NIR modulation and selectivity in the visible spectrum. Through the use of different nanocrystal fillers, active polymer-nanocrystal composites such as described herein may also be useful as solution-processible components in other electrochemical devices, such as batteries, supercapacitors, and dye-sensitized solar cells.

Some embodiments herein are described with reference to the use of nanocrystals. However, it should be understood that functional POM-based films may be produced without doping with any other materials or nanostructures. Moreover, in embodiments that utilize doping, materials other than nanocrystals, including metal ions, nanoparticles (amorphous or crystalline), nanorods, nanocones, nanowires, etc. may be used.

POMs are anionic oxide nanoclusters of early transition metals with a wide range of redox and optical properties and a rich structural and compositional diversity. They are typically synthesized in aqueous solutions and at low temperatures (e.g., room temperature to about 100° C.) using standard hydrolysis condensation reactions of oxoanions. Despite their promising optical and redox properties, the use of POMs in electrochromic devices has been elusive due to difficulties processing them into films. Stabilizing POMs with counter ions allow easy solution processing into thin films, however, the insulating nature of the counter ion strongly limits the electrochromic response.

The chemical condensation methods described herein may be of interest for use in electrochromic windows, display technology, thermal control coatings (e.g., satellites), and optical components, as well as in the automotive industry (e.g., automotive glass). The methods may be utilized for retrofit purposes to produce adhesive layers, which may present a low-cost solution to window replacement.

Referring now to the figures, FIG. 1 is a sectioned illustration of a dual pane electrochromic window 100 according to one embodiment of the present invention. The window 100 includes an outer pane 105 that typically faces an exterior environment (e.g., the outside of a building) and an inner pane 110 that typically faces an interior environment (e.g., the inside of a building) separated by a frame 115. The outer pane 105 and inner pane 110 may be glass, plastic, poly(methyl methacrylate) (PMMA, also known as acrylic glass or Plexiglass®), poly(ethylene terephthalate) (PET), quartz, ITO, or fluorine-doped tin oxide slides or another transparent substrate. A space separating the inner panes 110 and outer panes 105 may include a vacuum or an insulating gas such as air, argon or xenon.

In one embodiment, an interior surface of the outer pane 105 is coated with a thin film electrochromic device 120, such as a POM-based electrochromic device in accordance with the embodiments described herein. Additionally or alternatively, an exterior surface of the outer pane 105 and/or an interior or exterior surface of the inner pane 110 may be coated with the thin film electrochromic device 120. The thin film electrochromic device 120 may include transparent conductor films, an electrolyte, an electrochromic film that acts as an electrode and a counter electrode film. Embodiments of the thin film electrochromic device 120 are discussed in greater detail below with reference to FIGS. 2A-2B.

Figure 2A:
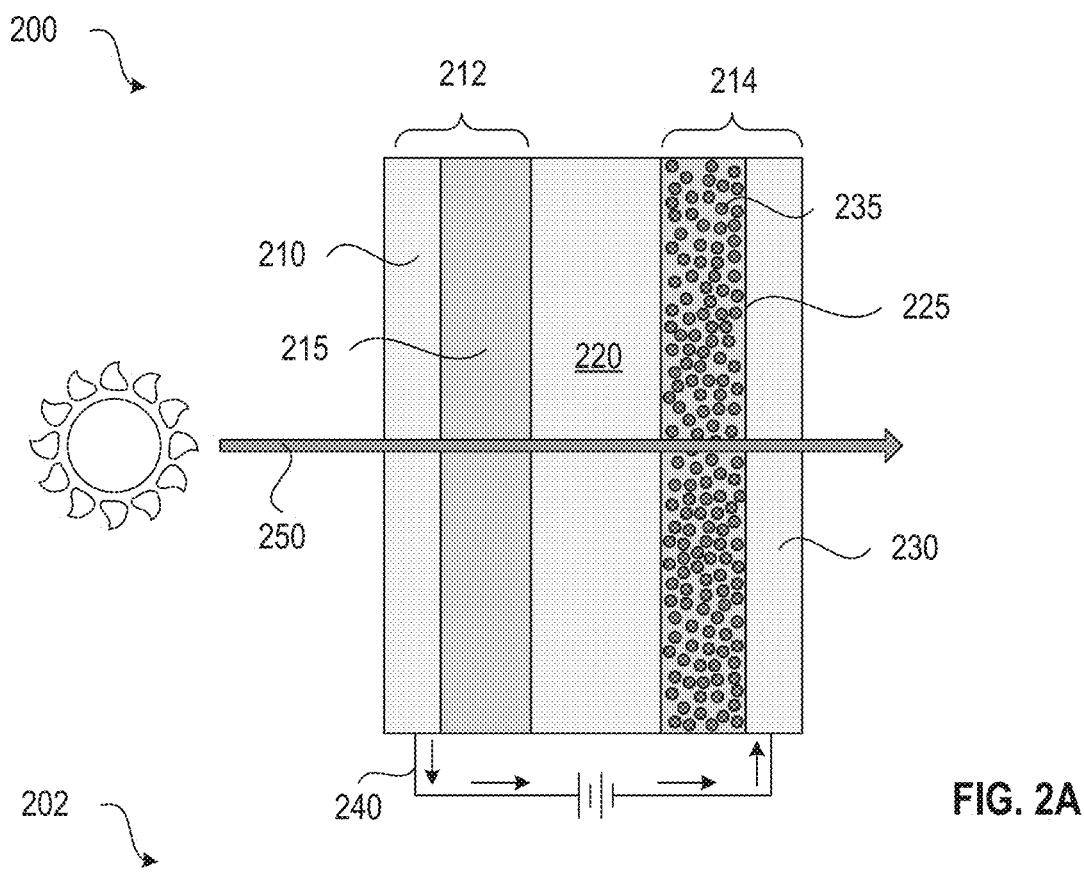
FIG. 2A illustrates a solid electrochromic device in an off state, according to one embodiment.
Figure 2B:
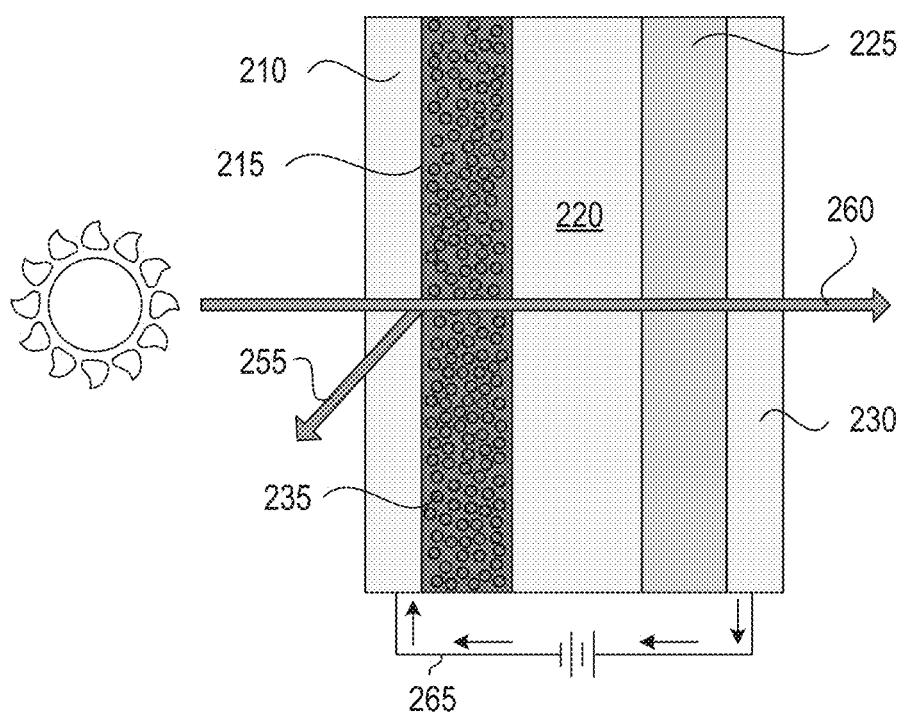
FIG. 2B illustrates a solid electrochromic device in an on state, according to one embodiment.

FIGS. 2A and 2B illustrate a solid electrochromic device, according to one embodiment. FIG. 2A illustrates the solid electrochromic device in an off state 200, while FIG. 2B illustrates the solid electrochromic device in an on state 202. The illustrated electrochromic device is a thin film stack having five layers. However, the thin film stack may have more or fewer layers (e.g., three layers in one embodiment). The electrochromic device may be used to coat a substrate such as a window to provide selective transmission properties for solar radiation control.

A functional layer of the electrochromic device (layer that exhibits electrochromic properties for the electrochromic device) is an electrochromic film 215. A thickness of the electrochromic film 215 may range from about 50 nanometers to about 5,000 nanometers in one embodiment. In a further embodiment, the thickness may range from about 300 nanometers to about 1,000 nanometers. The electrochromic film 215 may be, for example, a chemically-condensed POM film (as will be described in more detail with respect to FIGS. 4A and 4B), which may be produced via chemical condensation of a POM film, a POM-based nanocrystal composite film, or a POM-polymer-nanocrystal composite film that includes a polymer matrix of a lithium ion-conducting polymer interspersed with the POM network. In embodiments that utilize a polymer matrix, the polymer matrix may have lithium salt and transparent conducting oxide (TCO) nanocrystals (which may also be referred to herein as "near-infrared plasmonic nanocrystals" or "NIR plasmonic nanocrystals") dispersed throughout. In such embodiments, the lithium ion-conducting polymer may be poly(ethylene oxide) (PEO). Other possible polymers include poly(methyl methacrylate) (PMMA), poly(vinyl butyral) (PVB), cross-linked Poly(ethylene glycol) or a block copolymer such as PEO-block-poly (N,N-Dimethyl-acrylamide) (PEO-b-PDMA). Note that PMMA may exhibit insufficient conductance of lithium ions in a solid state, and PMMA molecules may be swollen by introducing a small amount of liquid to increase lithium conductance. This may cause the PMMA to have a gel state. In one embodiment, the TCO nanocrystals are ITO nanocrystals. Other possible TCO nanocrystals include aluminum-doped zinc oxide (AZO) nanocrystals, indium-doped zinc oxide (IZO) nanocrystals, gallium-doped zinc oxide (GZO) nanocrystals, zinc and tin-doped indium oxide (ZITO) nanocrystals, fluorine-doped tin oxide (FTO) nanocrystals, indium-doped cadmium oxide (CdO:In) nanocrystals, alkali or lanthanide metal-doped tungsten oxide ($M_xWO_3$), or vacancy-doped tungsten oxide ($WO_{3-x}$). A weight ratio of the TCO nanostructures to the lithium ion-conducting solid polymer may approximately 1:10 to approximately 2:1.

The electrochromic film 215 may be coupled to a transparent conductive layer 210. The transparent conductive layer 210 may be a thin film that conducts electrons, and may provide an electrical path to the electrochromic film 215. The transparent conductive layer 210 may be, for example, a layer of graphene, carbon nanorods or metal nanowires. One example of the transparent conductive layer 210 is an ITO film. When deposited as a thin film, the conductivity of an ITO layer commonly reaches 1000 S $cm^{-1}$ with greater than 80% optical transmittance in the visible region of the electromagnetic spectrum. The ITO film in one embodiment includes ITO nanocrystals having an average diameter of 10 nm or less. Other examples of a transparent conductor include an aluminum-doped zinc oxide (AZO) film, an indium-doped zinc oxide (IZO) film, a gallium-doped zinc oxide (GZO) film, an indium, gallium-doped zinc oxide (IGZO) film, a zinc, tin-doped indium oxide (ZITO) film, a fluorine-doped tin oxide (FTO) film, or a indium-doped cadmium oxide (CdO:In) film. Any of these films may be formed of nanocrystals and/or other nanostructures.

The electrochromic film 215 and the transparent conductive layer 210 together form an electrode 212 in one embodiment. For the electrochromic device to operate, the electrode 212 may be opposed by a counter electrode 214. The counter electrode 214 may include a second transparent conductive layer 230 coupled to an additional film 225. The second transparent conductive layer 230 may be formed of the same material or a different material from that of transparent conductive layer 210. The additional film 225 may be a lithium ion conducting polymer having a solid polymer matrix with metal oxide nanoparticles and/or a lithium salt dispersed in the matrix and/or a liquid added to make the polymer a gel. The solid polymer matrix may be composed of PEO, PMMA, or any of the other polymers described in association the embodiments of the electrochromic film 215. Alternatively, the additional film may be composed of metal oxide nanoparticles or a metal oxide porous material.

In contrast to the electrochromic film 215, the additional nanocomposite film 225 may not have electrochromic properties. Examples of such an additional nanocomposite film 225 include a nanocomposite film including metal oxide nanoparticles of cerium oxide, undoped indium oxide, undoped zinc oxide, or mixtures thereof. Alternatively, the nanocomposite film 225 may exhibit electrochromic modulation that is complementary to the electrochromic modulation of the electrochromic film 215. For example, the nanocomposite film 225 may be transparent when charged and colored when uncharged. An example of such a complementary nanocomposite film is a nanocomposite film containing NiO or $Fe_7(CN)_{18}$ (commonly known as Prussian blue).

The electrode 212 and the counter electrode 214 may be separated by a solid electrolyte 220. In one embodiment, the solid electrolyte 220 is coupled to and separates the electrochromic film 215 and the additional film 225. The solid electrolyte 220 may be a lithium ion-conducting polymer having a solid polymer matrix with lithium ions dispersed in the polymer matrix. In one embodiment, the lithium ion-conducting polymer is PEO. Other polymers previously discussed may also be used for the electrolyte 220.

In embodiments of the electrochromic film 215 that utilize condensed POMs, the electrochromic film 215 may contain plasmonic nanocrystal fillers (e.g., TCO nanocrystals). The condensed nanocomposite POM film couples the visible-spectral response of the condensed POM network with the plasmonic NIR-selectivity of the nanocrystals, achieving dual-band electrochromic modulation.

While the electrochromic device is in the off state 200, electrode 212 is uncharged and ions 235 (e.g., lithium ions) are trapped in the counter electrode 214 (e.g., in the additional film 225). As shown, electromagnetic radiation 250 is transmitted by the electrochromic device (e.g., passes through the all the layers of the electrochromic device) while it is in the off state 200. The electrochromic device may be switched to the on or active state by applying a reverse voltage potential 265 and charging the electrode 212. This causes the ions 235 to accumulate in the electrochromic film 215 of the electrode 212. As shown, radiation in the NIR region 260 of the electromagnetic spectrum is transmitted by the electrochromic device, while radiation in the visible region of the electromagnetic spectrum (e.g., visible light) 255 is blocked by the electrochromic film 215 (e.g., reflected by electrochromic film 215, absorbed into electrochromic film 215 as heat, or both) of the electrochromic device. In embodiments utilizing a POM-based nanocomposite film 215 containing plasmonic nanocrystals, both NIR light and visible light could be modulated independently. The electrochromic device may be switched back to the off state by applying a voltage potential 240, which causes the ions 235 to migrate back to the counter electrode 214.

Figure 3A:
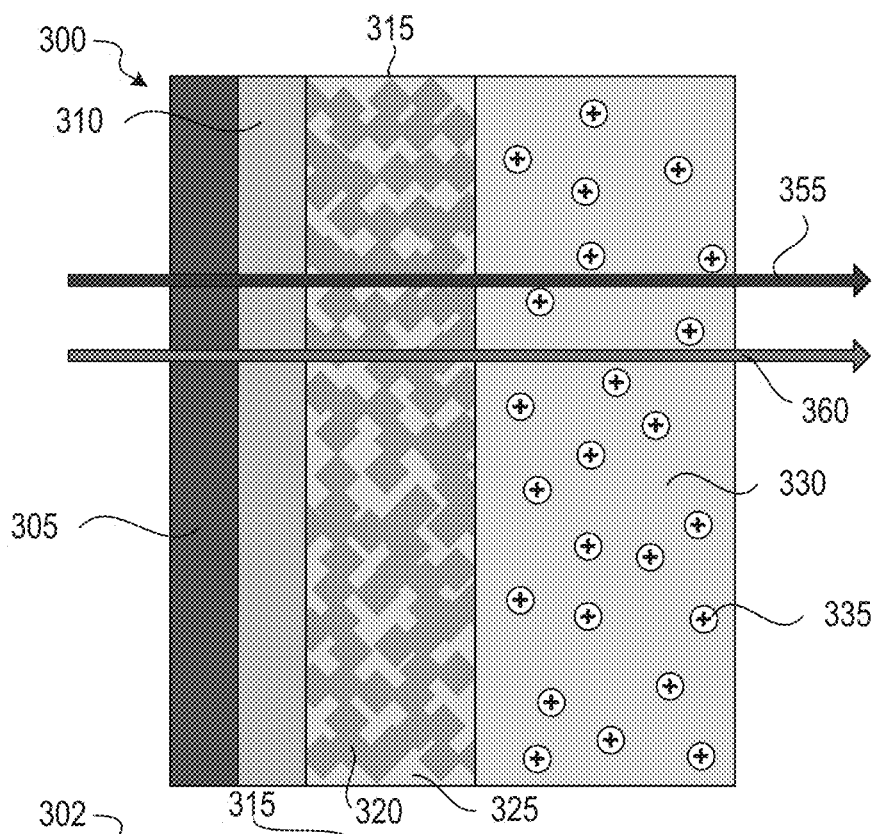
FIG. 3A illustrates a substrate with a POM-based electrochromic film in an off state, according to one embodiment.
Figure 3B:
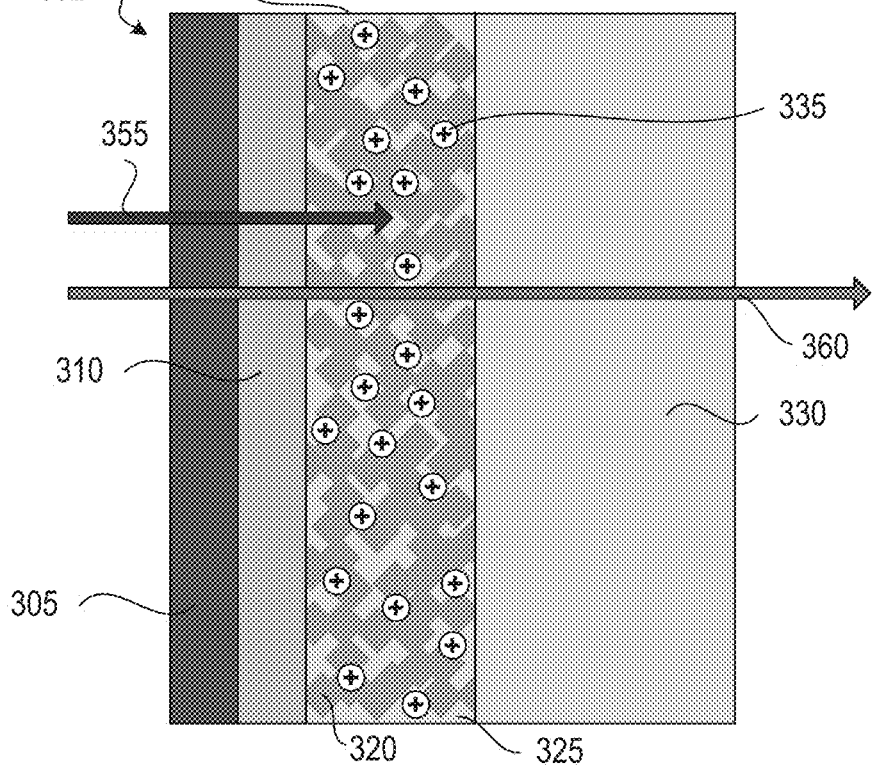
FIG. 3B illustrates a substrate with a POM-based electrochromic film in an on state, according to one embodiment.

FIGS. 3A and 3B illustrate a portion of a POM-based electrochromic device, according to an embodiment. FIG. 3A illustrates the portion of the electrochromic device in an off state 300. FIG. 3B illustrates the portion of the electrochromic device in an on state 302. The portion of the electrochromic device is similar to the electrochromic device of FIGS. 2A and 2B.

The illustrated portion of the electrochromic device includes a transparent conductive layer 310 coating a substrate 305. The substrate 305 may be a transparent substrate including, but not limited to glass (e.g., a window pane), quartz, or plastic (e.g., a Plexiglass® substrate). A POM-based electrochromic film 315 may coat the transparent conductive layer 210. Additionally, an electrolyte 220 may cover the electrochromic film 315. The electrochromic film 315 includes a condensed POM network 320, which may be a molecular network produced via chemical condensation of POM nanoclusters. In some embodiments, the condensed POM network 320 is an amorphous network. The condensed POM network 320 defines a void phase 325 through which ions may pass through, or may be occupied by other materials, such as plasmonic nanocrystals, while still allowing for the transport of ions (e.g., lithium ions). In some embodiments, the electrochromic film 315 may include TCO nanocrystals and a solid polymer matrix of a lithium ion-conducting polymer that occupy the void phase 325 of the condensed POM network 320.

In embodiments that utilize a condensed POM network 320 without plasmonic nanocrystals, ions 335 may be dispersed in the electrolyte 330 and/or in a counter electrode while the electrochromic device is in the off state 300. In this state, both visible light 355 and NIR radiation 360 are transmitted by the electrochromic device. While the device is in the on state 302, the lithium ions 335 diffuse to the condensed POM network 320 in the electrochromic film 315. As a result, the NIR radiation 360 is still transmitted by the electrochromic device, but transmission of the visible light 355 is blocked at the electrochromic film 315. It is noted that the transparent conductive layer 310 and electrolyte 330 may be similar to their respective identically named counterparts described with respect to FIGS. 2A and 2B.

Figure 4A:
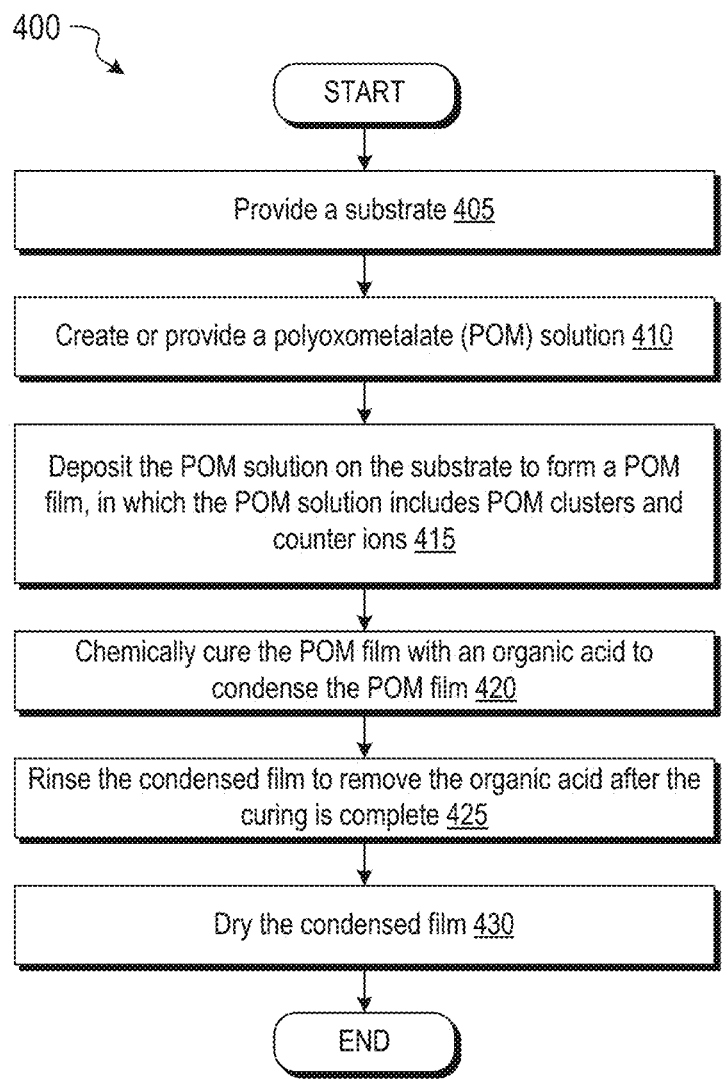
FIG. 4A is a flow chart illustrating a method for condensing a POM film on a substrate, according to one embodiment.

FIG. 4A is a flow chart illustrating a method 400 for condensing a POM film on a substrate (e.g., a transparent substrate), according to one embodiment. Method 400 may be performed using solution processing techniques at room temperature. Alternatively, one or more of the operations of method 400 may be performed at an elevated temperature. The resulting condensed film may correspond to the electrochromic films of FIGS. 2A, 2B, 3A, and 3B. In some embodiments, the resulting condensed film is doped with other materials, such as NIR plasmonic nanocrystals.

Referring now to FIG. 4A, at block 405 of method 400, a substrate is provided. In one embodiment, the substrate is a transparent substrate. Alternatively, a non-transparent or opaque substrate may be used. Examples of transparent substrates include substrates made of glass (e.g., a window pane), quartz, plastic (e.g., poly(methyl methacrylate), poly(ethylene terephthalate) (PET), etc.), or any other suitable transparent material. In some embodiments, the substrate is a flexible substrate (e.g., PET). For example, the substrate may be a PET adhesive layer. In such an embodiment, the resultant electrochromic film may be an adhesive that may be attached to a standard window or other surface. Thus, the electrochromic film may be used to retrofit existing windows for energy and cost savings. The substrate may be a large area PET or similar substrate, which may be suitable for automotive or other applications.

In some embodiments, the transparent substrate may include a conductive layer disposed on one or more surfaces. For example, the conductive layer may be a layer of graphene, carbon nanorods, metal nanowires, ITO, or any other suitable transparent conductive material. In some embodiments, a thin transition metal layer may be deposited on the transparent substrate, which may be thin enough to have a high (e.g., greater than about 90%) transmittance of visible and NIR radiation. In some embodiments, the transparent substrate may be flexible.

At block 410, a POM solution is created or provided, with the POM solution including POM clusters dispersed in a solvent. POM clusters are synthesized using standard protonation-condensation of oxoanions in aqueous solutions at variable pH and ambient pressure and temperature conditions. POM clusters are then precipitated from solution by addition of an organic or inorganic salt. The concentration of the POM solution can vary depending on the target film thickness. For example, for decaniobate POMs, $[N(CH_3)_4]_6Nb_{10}O_{28}$, a typical concentration of 100 mg/mL yields a film thicknesses of about 500 nm. The structure of the POMs is based on an anionic metal-oxo cluster with the general formula $[MO_x]_n$, where M is typically an early transition metal such as Ti, V, Nb, Ta, Cr, Mo, W or Fe and Co, with x in an integer ranging from 4 to 7, and n is an integer ranging from 6 to 36. Typical POM sizes are in the 1 nm to 2 nm range. In some embodiments, the POM clusters are dissolved in a polar solvent, which may be an organic polar solvent or water. For example, POM clusters and counter ions may be dispersed in pure water or a mixture of water/organic solvent or a combination thereof. In one embodiment, the POM solution includes 50-80% ethanol. In other examples, the POM solution may include water, ethanol, methanol, isopropanol, acetonitrile, acetone, ethyl acetate, tetrahydrofuran, dimethylsulfoxide, dymethylformmide, or combinations thereof. In one embodiment, the POM solution includes a water-ethanol solvent mixture.

In some embodiments, the POM solution may contain a single type of POM cluster or a mixture of different types of POM clusters (e.g., POMs having different compositions). The POM solution may contain additional constituents, such as lithium salt, lithium ion-conducting polymer, and NIR plasmonic nanocrystals, such that the additional constituents are distributed throughout the resulting POM film upon formation of the POM film. For example, NIR plasmonic nanocrystals distributed homogeneously through the POM film may promote selective NIR electrochromic characteristics across the POM film.

The NIR plasmonic nanocrystals may be tin-doped indium oxide (ITO), aluminum-doped zinc oxide (AZO), indium-doped zinc oxide (IZO), gallium-doped zinc oxide (GZO), zinc and tin-doped indium oxide (ZITO), fluorine-doped tin oxide (FTO), or indium-doped cadmium oxide (CdO:In), alkali or lanthanide metal-doped tungsten oxide ($M_xWO_3$), vacancy-doped tungsten oxide ($WO_{3-x}$), or a combination thereof. The nanocrystals may have high crystallinity, and may have a homogeneous composition. In some embodiments, the nanocrystals may be capped with non-polar organic ligands to prevent aggregation when in their initial suspension. To enable electronic transport between nanocrystals and POM nanoclusters within a resultant POM film, the organic ligands adsorbed on the nanocrystal surfaces may be removed by a ligand exchange process. This process renders the nanocrystal surfaces bare and hydrophilic, allowing the nanocrystals to interact with the POM nanoclusters and/or with various polymers.

The nanocrystals may initially be suspended in a non-polar solvent such as hexane, heptane, toluene, benzene or octane. The non-polar solvent may functionalize and stabilize the nanocrystals. The functionalized and stabilized nanocrystals suspended in the non-polar solvent may be admixed with fluoroborate salts, such as nitrosonium tetrafluoroborate ($NOBF_4$), diazonium tetrafluoroborate or triethyloxonium tetrafluoroborate. This enables $[BF_4]^-$ anions to replace ligands on the surfaces of the nanocrystals. The fluoroborate salts may be dispersed in a polar organic solvent such as N,N-dimethyl formamide (DMF). In such an embodiment, DMF molecules may also replace some of the stripped ligands on the surfaces of the nanocrystals. Other techniques may also be used to remove the ligands from the nanocrystals.

In one embodiment, the following ligand exchange procedure is performed. A dispersion of nanocrystals in hexane is combined with a dichloromethane solution of $NOBF_4$ at room temperature. The resulting mixture may be shaken until precipitation of the nanocrystals occurs. Centrifugation may be performed to separate the nanocrystals from the solution, and the nanocrystals may be redispersed in a hydrophilic media such as DMF, dimethylsulfoxide (DMSO) or acetonitrile. To purify the nanocrystals, toluene may be added to flocculate the nanocrystal dispersion.

In an alternative embodiment, the ligand exchange process is carried out based on a phase transfer process. In this procedure, the nanocrystal hexane dispersion is combined with acetonitrile to form a two-phase mixture. $NOBF_4$ is then added to the mixture, and the mixture may be stirred. This causes the original surface ligands to be replaced by the $[BF_4]^-$ anions. The surface-modified nanocrystals may then be purified by precipitation with the addition of toluene, and the precipitated nanocrystals may be redispersed into various hydrophilic media.

In another embodiment, the ligand exchange process is carried out by adding the nanocrystals hexane dispersion to DMF to form a two-phase mixture. $NOBF_4$ or 4-nitrobenzenediazonium tetrafluoroborate compounds such as 4-bromobenzenediazonium tetrafluoroborate or 4-bromobenzenediazonium tetrafluoroborate are added to the solution. This causes the nanocrystals to be transferred from an upper hexane layer to a lower DMF layer. The nanocrystals may then be purified as described above.

In another embodiment, the nanocrystals are added to trimethyloxonium tetrafluoroborate ($Me_3OBF_4$) or trialkyl oxonium salts dissolved in MeCN to form a biphasic solution. The solution strips the ligands from the nanocrystals. Chloroform may be added to the solution, and the solution is centrifuged to separate out precipitated nanocrystals. The nanocrystals are then washed with additional chloroform to remove excess $Me_3OBF_4$ (or trialkyl oxonium) and methyl oleate, before redispersing in DMF.

Any of the aforementioned process may be repeated one or more times to produce a pure dispersion of nanocrystals. Once the nanocrystals are precipitated, they may be redispersed in a hydrophilic media, such as the POM solution. An exemplary process is described as follows: an aqueous solution of POMs (in which the concentration varies depending on the targeted final volume fraction and the POM used, and may typically be about 200 mg/mL for $[N(CH_3)_4]_8Nb_6O_{19}$) is added to a 1 mL DMF nanocrystal dispersion (concentration of about 60 mg/mL), which instantaneously turns opaque. After vigorously stirring, the slurry becomes clear as a result of bonding POMs to the naked ITO nanocrystals, which now become soluble in water. The colloidal solution is washed 3 times with DMF/$H_2O$ and redispersed in water or water/ethanol solvents. The composite POM solution, containing the nanocrystals, may then be deposited on the transparent substrate.

At block 415, a POM solution is deposited on the transparent substrate to form a POM film. In some embodiments, the POM solution is deposited via spin-coating. For example, a spin speed of about 500-6,000 rotations per minute (RPM) for a spin time of about 60-120 seconds may be used to achieve a desired thickness. For example, spin settings and solution concentration may be adjusted to achieve a thickness between about 20-1,000 nanometers. In some embodiments, the POM solution may be deposited on the transparent substrate by spray coating, slot die coating, dip coating, or other solution deposition techniques.

In some embodiments, the POM solution may be deposited under ambient conditions, so that the POM film forms in ambient air at about room temperature (e.g., between about 20° C. and about 23.5° C.), and at a pressure of about 1 atm. In other embodiments, the solution and the substrate may be heated to a temperature between about 50° C. and 100° C.

The constituents of the POM solution include ionic POM clusters and counter ions (e.g., organic or inorganic counter ions) dispersed in a solvent. The POM clusters may have a composition having the general formula $[M_xO_y]^{(5x-2y)-}$, where M is an early transition metal such as vanadium, niobium, tantalum, molybdenum, or tungsten, x is an integer value ranging from 4 to 36, and y is an integer value ranging from 16 to 252. When balanced by a counter ion, the general formula may have the form of $B_z[M_xO_y]$, where B is an organic counter ion such as tetraalkyl ammonium (e.g., tetrabutyl ammonium) or an inorganic counter ion such as an alkali metal (e.g., lithium, sodium, potassium, or rubidium). In some embodiments, the POM clusters may be at least one of metal-substituted POM clusters or heteropolyoxometalate (HPOM) POM clusters. The metal-substituted POM clusters may have a general formula of $[M'M_xO_y]^{z-}$, where M' is a substituted transition metal such as titanium, zirconium, chromium, iron, nickel, cobalt, or copper. The HPOM clusters may have a general formula of $[M_xAO_y]^{z-}$, where A is a hetero atom such as silicon or phosphorus. In some embodiments, the POM clusters may be in the form of POM nanoclusters, which may have homogeneous compositions or mixed compositions (e.g., different transition metals throughout), and the POM solution may include different types of POM nanoclusters. The POM nanoclusters are crystalline and may have sizes ranging from about 1 nm to about 2 nm.

In some embodiments, if the POM solution includes NIR plasmonic nanocrystals (e.g., metal oxide nanocrystals), depositing the POM solution results in a POM film that is doped with NIR plasmonic nanocrystals. In some embodiments, a nanocrystal film may be doped with POMs after a ligand-stripped nanocrystal film has been obtained on the transparent substrate. In such embodiments, the POMs fills the porous space in the nanocrystal film (e.g., in situ doping).

At block 420, the POM film is chemically cured with an acid (e.g., an organic acid solution or vapor) to condense the POM clusters and remove the counter ions. Organic counter ions, for example, help to stabilize the POM nanoclusters and improve film formation properties, but may hamper the electrochromic response of the POM film owing to their insulating nature. Heat treatment is typically used to thermally decompose the counter ions (e.g., by subjecting the POM film to a temperature of about 400° C. or greater) and condense the POMs. Unlike heat treatment, which also thermally condenses the POM nanoclusters and causes disorder, chemically treating the POM film at about room temperature can remove the counter ions (by protonating the POM nanoclusters and displacing the counter ions) and condense the POM film while maintaining an extended molecular POM network within the POM film. In the condensation reaction, protons from the acid ($H^+$) bond the terminal oxygens of the POM clusters, displacing the counter ions of the POM film into the solution phase. Protonated POMs can then condense to convert the POM film into a POM film, in which bridging of the metal-oxo bonds and release water molecules occurs according to:

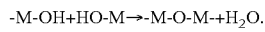

The POM film may be soaked in the organic acid for a treatment time of about 1 minute to about 1 hour. Alternatively, shorter or longer treatment times may be used. The treatment time may depend on the strength/concentration of the organic acid solution as well as a thickness of the POM film. For example, an organic acid solution with a 10% (volume percent) concentration may be used with a treatment time of about 3 minutes, and an organic acid solution with a concentration of 50% (volume percent) may be used with a treatment time of about 30 seconds. In some embodiments, the treatment time may increase with increasing POM film thickness. For example, a treatment time for a film having a first thickness may be twice as long as the treatment time for a film having a second thickness when the second thickness is twice as thick as the first thickness (e.g., the first and second thicknesses are about 1 micrometer and about 2 micrometers, respectively).

In some embodiments, the POM film may be treated with the organic acid (e.g., an organic acid solution or vapor) at a temperature between about 10° C. and about 200° C., and/or at a pressure between about 0.1 atm to 10 atm. In some embodiments, the POM film may be treated with the organic acid under ambient conditions. For example, the POM film may be treated in ambient air at about room temperature (e.g., between about 20° C. and about 23.5° C.), and at a pressure of about 1 atm. Alternatively, the POM film may be treated in a pressurized environment or a vacuum environment. Additionally, the POM film may be chemically treated while heated. For example, the substrate and POM film may be heated to a temperature of up to about 200° C. while exposed to the organic acid. This may accelerate and/or help facilitate the chemical treatment. In other embodiments, the POM film may be heated to a temperature above 200° C. while exposed to the organic acid.

The organic acid may include formic acid, acetic acid, trifluoroacetic acid, citric acid, oxalic acid, uric acid, lactic acid, benzoic acid, fumaric acid, succinic acid, tartaric acid, maleic acid, ascorbic acid, propionic acid, butyric acid, sorbic acid, tartaric acid, another organic acid, or a combination thereof. In some embodiments in which the organic acid is in a form of an organic acid solution, the organic acid solution may contain an organic acid diluted to between 0% and 99.9%. In some embodiments, the organic acid is undiluted. In some embodiments, the organic acid is diluted between about 5% and about 15% (mass percent). As an example, the organic acid solution may be diluted by acetonitrile, water and/or alcohols. For example, the organic acid solution may contain water at about 15% and 25% (volume percent), with the remainder of the organic acid solution being ethanol or another suitable polar solvent. In one embodiment, the organic acid is diluted to at least or less than 20% in water (i.e., an organic acid solution having at least or less than 20% water by volume). In one embodiment, the organic acid is diluted to at least 10% in water. In one embodiment, the organic acid is diluted to less than 20% in water. In one embodiment, the organic acid is diluted to less than 10% in water. In one embodiment, ethanol is used to avoid the dissolution of the POM film in the acidic solution.

In some embodiments, the organic acid includes formic acid. Formic acid may be used to prevent damage to the transparent substrate, particularly when the transparent substrate is a flexible polymer substrate. For example, about 10% (volume percent) formic acid may be used to perform a 3 minute curing reaction.

At block 425, the condensed POM film is rinsed to remove the organic acid and/or any residual organic material after curing is complete. In some embodiments, the condensed POM film may be rinsed multiple times with pure solvent (e.g., ethanol, water, or any other suitable polar or non-polar solvent) to remove all residual organic material. In one embodiment, the condensed POM film is rinsed three or more times. In some embodiments, the condensed POM film is treated with a water removal agent. For example, the POM film may be rinsed using a solution that includes a water removal agent.

Chemically condensing POM films may yield films having a general formula $M_xO_y \cdot nH_2O$ (or $M'M_xO_y \cdot nH_2O$, $M_xAO_y \cdot nH_2O$, $M'M_xAO_y \cdot nH_2O$, or a combination thereof, depending on the POM nanoclusters of the original POM solution), where n is an integer value ranging from 1-3. The presence of water in the molecular network may be detrimental to the electrochromic performance of the film, as the water may induce material degradation upon electrochemical cycling. Thus, an optional water removal step may be performed. Chemical dehydration, for example, involves soaking the condensed POM film in a solution containing a water removal agent, such as triethyl orthoformate (TEOF) or trifluoroacetatic anhydride (TFAA). In some embodiments, the water may be removed using thermal dehydration techniques, such as annealing the condensed POM film at an elevated temperature for a time period (e.g., a temperature of about 150° C. for about 1 hour in one embodiment). In some embodiments, chemical treatment by a water removal agent may be used to avoid subjecting the POM film to high temperatures. In some embodiments, a water removal agent may be used in conjunction with heating the condensed POM film to more quickly remove water from the condensed POM film. After water removal, the condensed POM film may have a general formula of $M_xO_y$ (or $M'M_xO_y$, $M_xAO_y$, $M'M_xAO_y$, or a combination thereof, depending on the POM nanoclusters of the original POM solution).

At block 430, the condensed POM film is dried. In some embodiments, the condensed POM film is dried using a flow of nitrogen gas (or any other suitable inert gas). In some embodiments, a flow of ambient air is used to dry the condensed POM film. In some embodiments, the condensed POM film is dried at room temperature under ambient conditions. Alternatively, the condensed POM film may be dried at an elevated temperature.

Figure 4B:
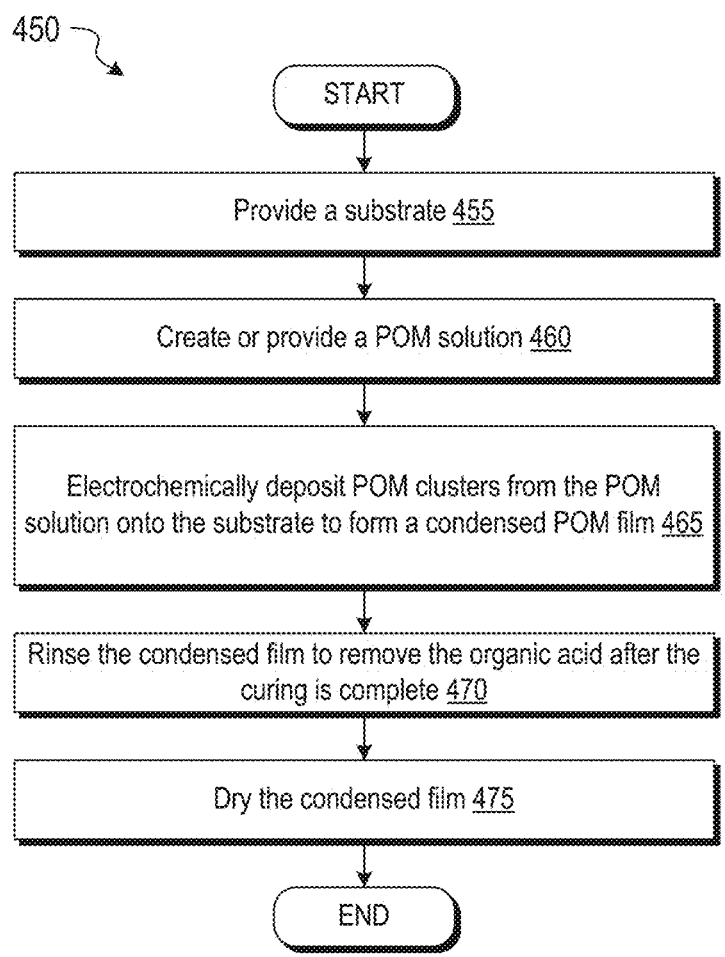
FIG. 4B is a flow chart illustrating a method for electrochemically depositing a POM film onto a substrate, according to one embodiment.

FIG. 4B is a flow chart illustrating a method 450 for electrochemically depositing a POM film onto a substrate, according to one embodiment. Method 450 may be performed using solution processing techniques at room temperature. Alternatively, one or more of the operations of method 450 may be performed at an elevated temperature. The resulting condensed film may correspond to the electrochromic films of FIGS. 2A, 2B, 3A, and 3B. In some embodiments, the resulting condensed film is doped with other materials, such as NIR plasmonic nanocrystals.

Referring now to FIG. 4B, at block 455 of method 450, a substrate is provided. The substrate may be a conductive substrate, and/or may be coated with a conductive material. The substrate may be similar to the substrate described above with respect to block 405 of FIG. 4A.

At block 460, a POM solution is created or provided. Block 460 may be performed in a substantially similar manner as described above with respect to block 410 of FIG. 4A.

At block 465, POM clusters of the POM solution are electrochemically deposited onto the substrate to form a condensed POM film. In one embodiment, the substrate is immersed in the POM solution (which contains anionic POM clusters and counter ions). An electrochemical potential is applied to the substrate, which causes the POM clusters to be electrochemically deposited and condensed onto the substrate, forming the condensed POM film. Without being bound by theory, the deposition, for a M-based POM, may be described by the following mechanism:

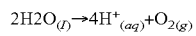

$2H2O_{(l)} \rightarrow 4H^+_{(aq)} + O_{2(g)}$

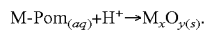

$M\text{-Pom}_{(aq)} + H^+ \rightarrow M_xO_{y(s)}$.

Acid may be generated locally at the surface of the substrate via electrochemical splitting of water. In some embodiments, the substrate is held at a potential of greater than 1 V (e.g., 2.5 V vs. Ag/AgCl).

In one embodiment, the electrochemical potential is a pulsed electrochemical potential. For example, applying a pulsed electrochemical potential rather than a constant/continuous electrochemical potential may reduce the opacity of the resulting condensed films. In one embodiment, the pulsed electrochemical potential is a series of alternating on pulses (e.g., non-zero potential relative to ground) and off pulses (e.g., zero potential relative to ground), with an absolute amplitude of the on pulses ranging from 1 V to 3 V. In one embodiment, the absolute amplitude of the on pulses is 2.5 V. In one embodiment, a total time duration of the on pulses ranges from 1 second to 10,000 seconds. In one embodiment, a time duration for each of the on pulses ranges from 0.01 seconds to 10 seconds. In one embodiment, a time duration of each of the off pulses ranges from 0.01 seconds to 100 seconds. In one embodiment, a total time duration of the on pulses ranges from 50 seconds to 200 seconds, and/or a time duration for each of the off pulses ranges from 1 second to 20 seconds. In one embodiment, a total time duration of the on pulses ranges from 50 seconds to 100 seconds, and/or the time duration for each of the off pulses ranges from 2 seconds to 10 seconds. In one embodiment, a time duration for each of the on pulses ranges from 1 second to 3 seconds.

Blocks 470 and 475 may be performed in substantially similar manners as described above with respect to blocks 425 and 430, respectively, of FIG. 4A.

Figure 5:
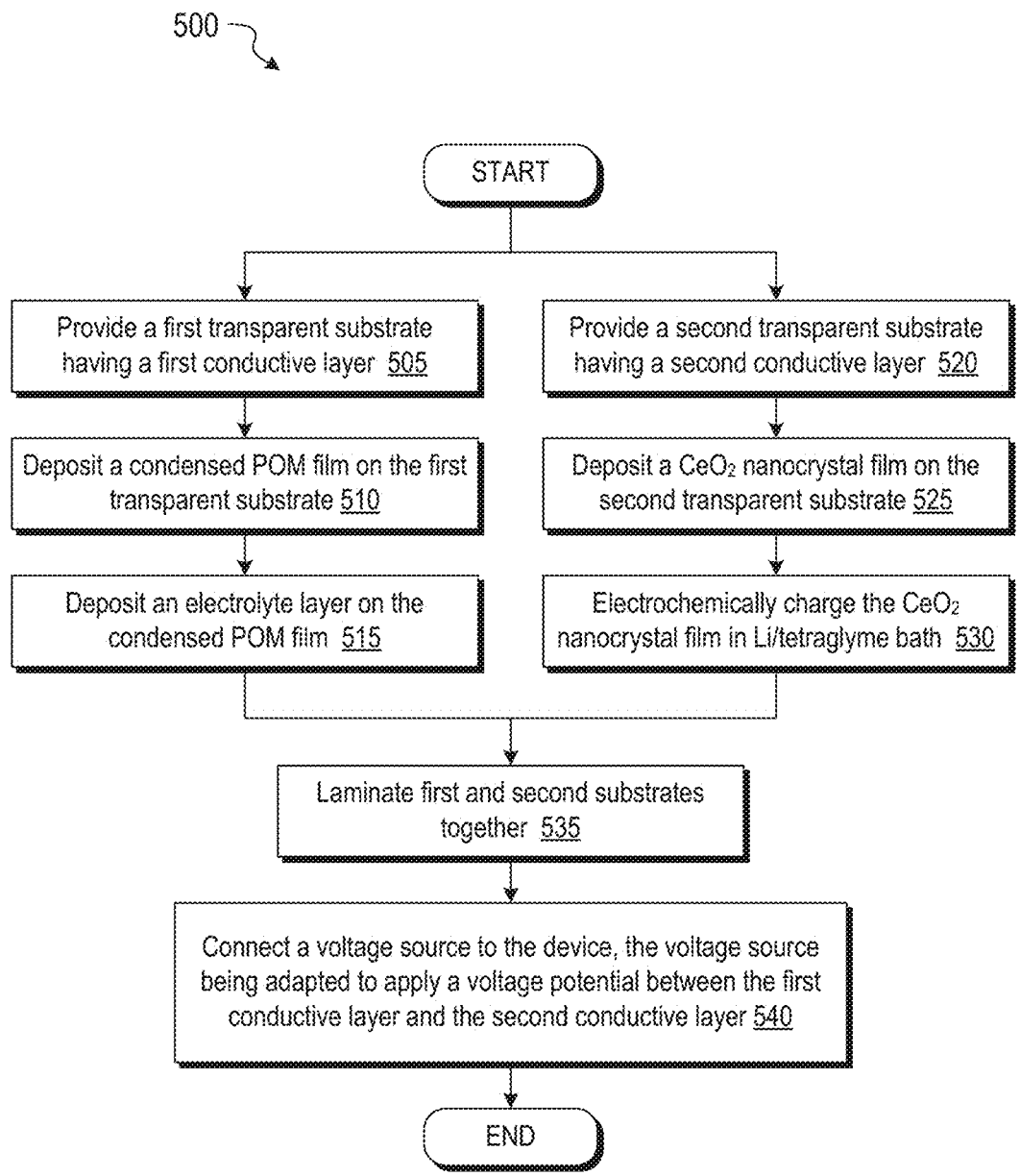
FIG. 5 is a flow chart illustrating a method for producing an electrochromic device, according to one embodiment.

FIG. 5 is a flow chart illustrating a method 500 for producing an electrochromic device, according to one embodiment. Method 500 may be performed to produce the electrochromic devices of FIGS. 2A, 2B, 3A, and 3B, for example.

Referring now to FIG. 5, at block 505, a transparent substrate having a first conductive layer is provided. For example, the transparent substrate may be similar to that described with respect to block 405 of FIG. 4A, and includes a similar conductive layer disposed thereon (e.g., a layer of graphene, carbon nanorods, metal nanowires, ITO, or any other suitable transparent conductive material). The first conductive layer serves as an electrode of the electrochromic device, and may be the same as conductive layer 210, as described with respect to FIGS. 2A and 2B.

At block 510, a condensed POM film is deposited on the first conductive layer to form a first electrode. The condensed POM film may be deposited in accordance with any embodiment of method 400 or method 450, as described with respect to FIGS. 4A and 4B, respectively.

In some embodiments, the condensed POM film may act as an electrode, and the first conductive layer may be omitted. At block 515, an electrolyte layer is deposited on the condensed POM film. For example, the electrolyte layer may be a solid electrolyte layer placed in contact with the condensed POM film. In some embodiments, the electrolyte layer a may be a lithium ion-conducting polymer having a solid polymer matrix with lithium ions dispersed in the polymer matrix and/or may include nanocrystals. In one embodiment, the lithium ion-conducting polymer is PEO. Other polymers previously discussed may also be used for the electrolyte layer. The electrolyte layer may be the same as solid electrolyte 220, as described with respect to FIGS. 2A and 2B. In some embodiments, the electrolyte layer includes one or more of PMMA, lithium bis-trifluoromethanesulfonimide (LiTFSI), or tetraethylene glycol dimethyl ether (tetraglyme). In some embodiments, the electrolyte layer is deposited (e.g., using a suitable deposition process), or may be a free-standing sheet that may be physically placed in contact with the condensed POM film.

Blocks 520, 525, and 530 may be performed before, after, or simultaneously with one or more of blocks 505, 510, or 515. At block 520, a second transparent substrate having a second conductive layer is provided. The second transparent substrate may be similar to the first transparent substrate, or may utilize different materials.

At block 525, a $CeO_2$ nanocrystal film is deposited on the second transparent substrate to form a second electrode. In some embodiments, the $CeO_2$ nanocrystal film may act as an electrode, and the first conductive layer may be omitted. In other embodiments, films of other materials may be deposited in addition to or in lieu of $CeO_2$ nanocrystals, including, but not limited to, nickel oxide (NiO), iridium oxide ($IrO_2$) layer, any other suitable conductive layer described herein, or combinations thereof. In one embodiment, the film is thermally annealed (e.g., at a temperature ranging from 150° C. to 250° C. for 15 minutes to 60 minutes). At block 530, the $CeO_2$ film is electrochemically charged in a bath containing lithium ions and tetgraglyme. In some embodiments, block 530 may be omitted or modified depending on the materials used to form the second electrode.

After blocks 515 and 530, at block 535, the first substrate (having the first conductive layer, the condensed film, and the electrolyte layer disposed thereon) and the second substrate (having the $CeO_2$ nanocrystal film disposed thereon) are laminated together (e.g., heated while under compression and/or vacuum).

At block 540, a voltage source is connected to the device. The voltage source may be connected to the first conductive layer and the second conductive layer. For example, each of the first conductive layer and the second conductive layer may have leads that facilitate interfacing with the voltage source. The voltage source may be configured to apply a forward or reverse potential to the electrochromic device, as described with respect to FIGS. 2A and 2B.

Figure 6A:
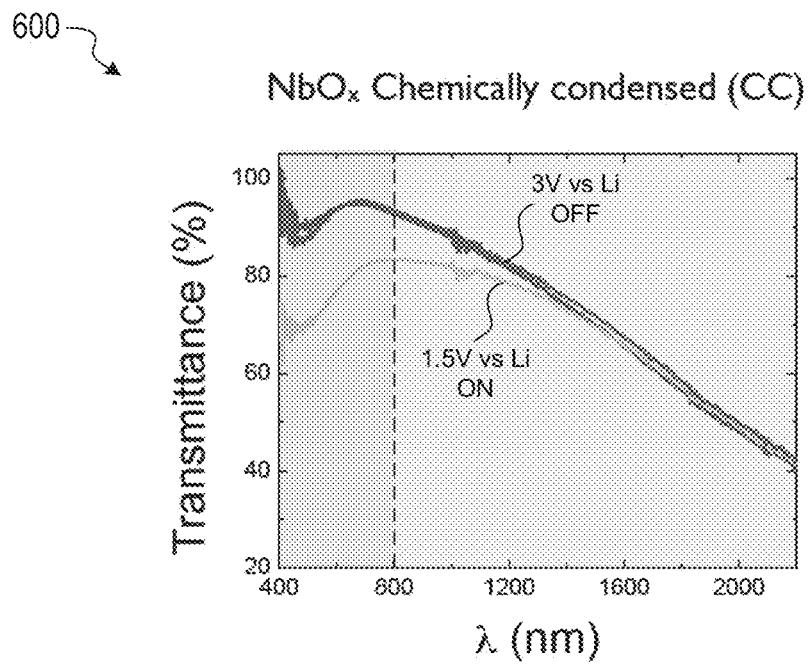
FIG. 6A is a transmittance spectrum for an electrochromic film based on a chemically-condensed electrochromic film in both an off state and an on state, according to one embodiment.
Figure 6B:
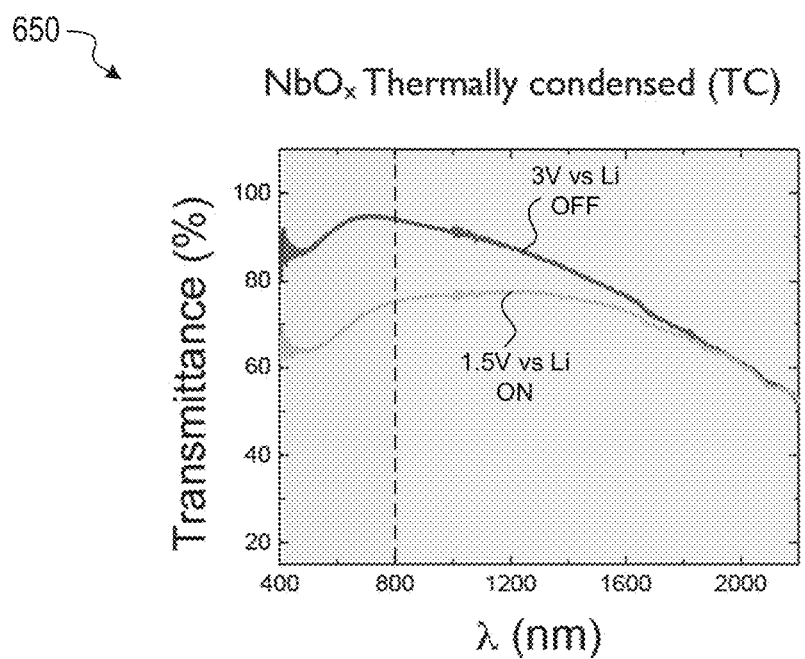
FIG. 6B is a transmittance spectrum for an electrochromic film based on a thermally-condensed electrochromic film in both an off state and an on state.

FIG. 6A shows a plot 600 of electrochromic response (i.e. transmittance under applied voltage versus wavelength) for an $NbO_x$ film obtained by chemical condensation (CC) of a POM film, and FIG. 6B shows a plot 650 of electrochromic response for an $NbO_x$ film obtained by standard thermal condensation (TC) of a POM film. The CC-produced film was produced in accordance with an embodiment of method 400. Each of plots 600 and 650 show the corresponding ON state (applied potential of 1.5 V) and OFF state (applied potential of 3 V) of the electrochromic response.

Comparison of plots 600 and 650 shows that an optical response of the CC-produced film is similar to the TC-produced film. However, the CC-produced film may exhibit better spectral-selectivity in the visible range than the TC-produced film. Specifically, the ON state of the CC-produced film in some embodiments peaks near 800 nm with decreasing transmittance in the NIR range. By contrast, the ON state of the TC-produced film appears to have a relatively flat spectrum at around 800 nm and into the NIR range, with a slight increase in transmittance between 1200 and 1600 nm. Moreover, the switching speed and coloration efficiency of the CC-produced film may be superior to those of the TC-produced film.

Figure 7:
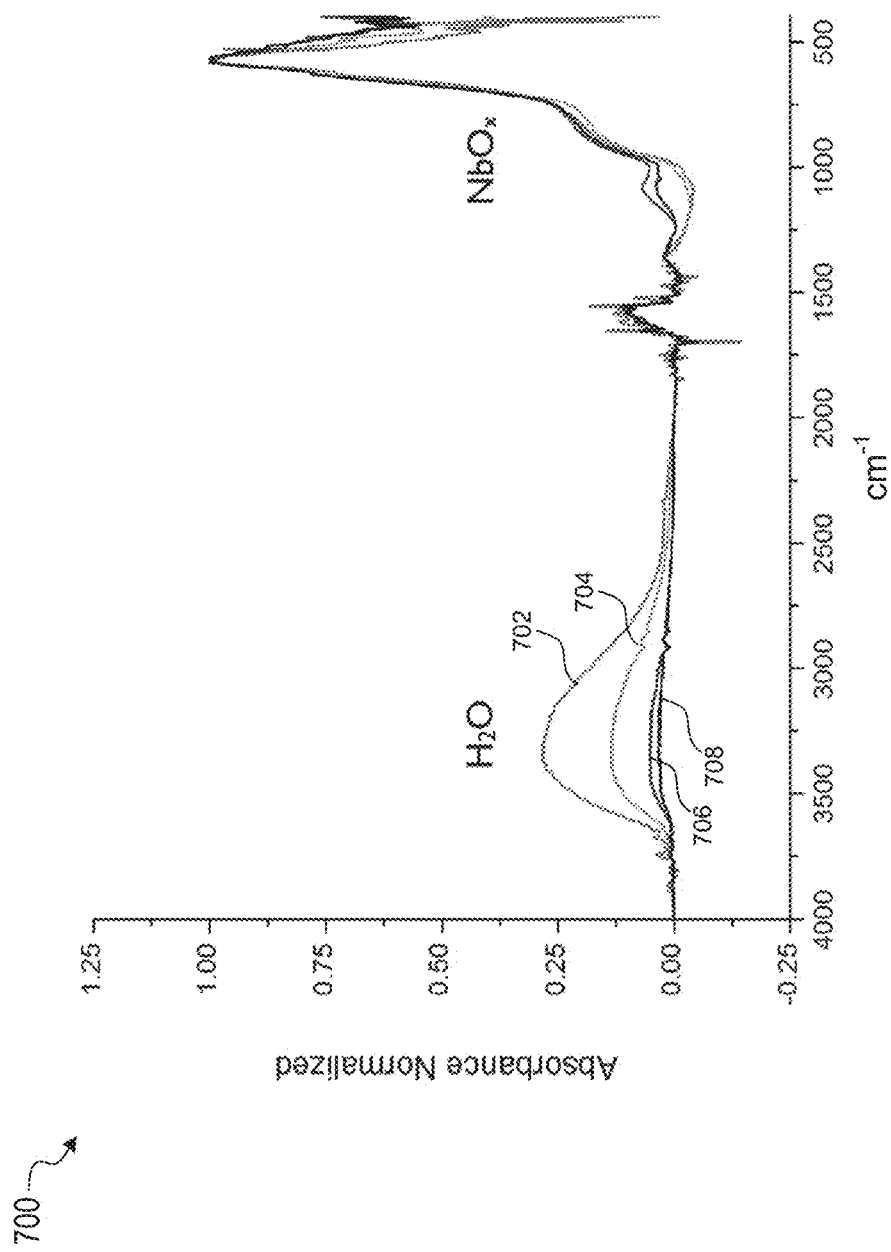
FIG. 7 is a plot of a Fourier transform infrared spectroscopy (FTIR) spectrum of a chemically-condensed electrochromic film after various treatments with a water removal agent, according to one embodiment.

FIG. 7 is a plot 700 of a Fourier transform infrared spectroscopy (FTIR) spectrum of a CC-produced $NbO_x$ film after various treatments with a water removal agent. Plot 700 corresponds to a CC-produced film produced in accordance with an embodiment of method 400, involving a 3 minute organic acid solution treatment (10% formic acid in ethanol). Plot 700 shows a normalized absorbance peak for water of about 0.25, corresponding to an as-prepared film with no water removal agent treatment (curve 702). The peak is shown to diminish for different treatment conditions with a water removal agent. For example treatment with TEOF at 100° C. for 3 hours shows a normalized absorbance peak for water of about 0.13 (curve 704), treatment with TEOF at 100° C. for 73 hours shows a normalized absorbance peak for water of less than 0.1 (curve 706), and treatment with TEOF at 150° C. for 24 hours shows an even lesser normalized absorbance peak for water (curve 708), the latter of which appears to effectively eliminate the absorbance peak of water.

Table 1 below includes performance metrics showing that chemically-condensed niobate films ($NbO_x$ films) have better electrochromic properties (namely switching time and coloration efficiency) than thermally-condensed (TC) $NbO_x$ films. Switching time $t_{k\%}$, is defined as the time required to achieve k % of the full inserted charge. Coloration efficiency is defined as the change in optical density (at wavelength=550 nm) per inserted charge density. Inserted charge density was determined from chronoamperometry measurements between 1.5 V and 3 V vs. $Li/Li^+$. A film thickness for all of the films of Table 1 was 200 nm±30 nm.

TABLE 1

Electrochromic performance parameters of chemically-condensed (CC) $NbO_x$ films compared to thermally-condensed (TC) $NbO_x$ films

| $[Nb_{10}O_{28}]^{6-}$ POM film processing | Switching time (s) | | Inserted charge density ($mC/cm^2$) | Change in optical density at λ = 550 nm | Coloration Efficiency ($cm^2/C$) |
|---|---|---|---|---|---|
| | $t_{50\%}$ | $t_{90\%}$ | | | |
| CC performed at RT, chemically dehydrated at 100° C. | 1.5 | 26 | 1.9 | 0.11 | 58 |
| CC performed at RT, thermally dehydrated at 200° C. | 1.2 | 20 | 2.3 | 0.10 | 44 |
| TC performed at 400° C. | 3.3 | 63 | 6.6 | 0.14 | 21 |

In one embodiment, a switching time, $t_{50\%}$, of a chemically-condensed POM film is less than 3 seconds and greater than 0 seconds. In one embodiment, $t_{50\%}$ is less than 1.5 seconds and greater than 0 seconds. In one embodiment, $t_{50\%}$ ranges from 1 second to 2 seconds. In one embodiment, t50% ranges from 1.1 seconds to 1.6 seconds. In one embodiment, $t_{50\%}$ ranges from 1.2 seconds to 1.5 seconds. In one embodiment, a switching time, $t_{90\%}$, of a chemically-condensed POM film is less than 60 seconds and greater than 0 seconds. In one embodiment, $t_{90\%}$ is less than 30 seconds and greater than 0 seconds. In one embodiment, $t_{90\%}$ is less than 21 seconds and greater than 0 seconds. In one embodiment, $t_{90\%}$ ranges from 15 seconds to 30 seconds. In one embodiment, $t_{90\%}$ ranges from 19 seconds to 27 seconds. In one embodiment, $t_{90\%}$ ranges from 20 seconds to 26 seconds. In one embodiment, a coloration efficiency of a chemically-condensed POM film is greater than 21 $cm^2/C$. In one embodiment, the coloration efficiency of a chemically-condensed POM film is greater than 25 $cm^2/C$. In one embodiment, the coloration efficiency of a chemically-condensed POM film is greater than 30 $cm^2/C$. In one embodiment, the coloration efficiency is greater than 40 $cm^2/C$. In one embodiment, the coloration efficiency is greater than 50 $cm^2/C$. In one embodiment, the coloration efficiency is greater than 55 $cm^2/C$. In one embodiment, the coloration efficiency ranges from 43 $cm^2/C$. to 59 $cm^2/C$. In one embodiment, the coloration efficiency ranges from 44 $cm^2/C$. to 58 $cm^2/C$.

Figure 8:
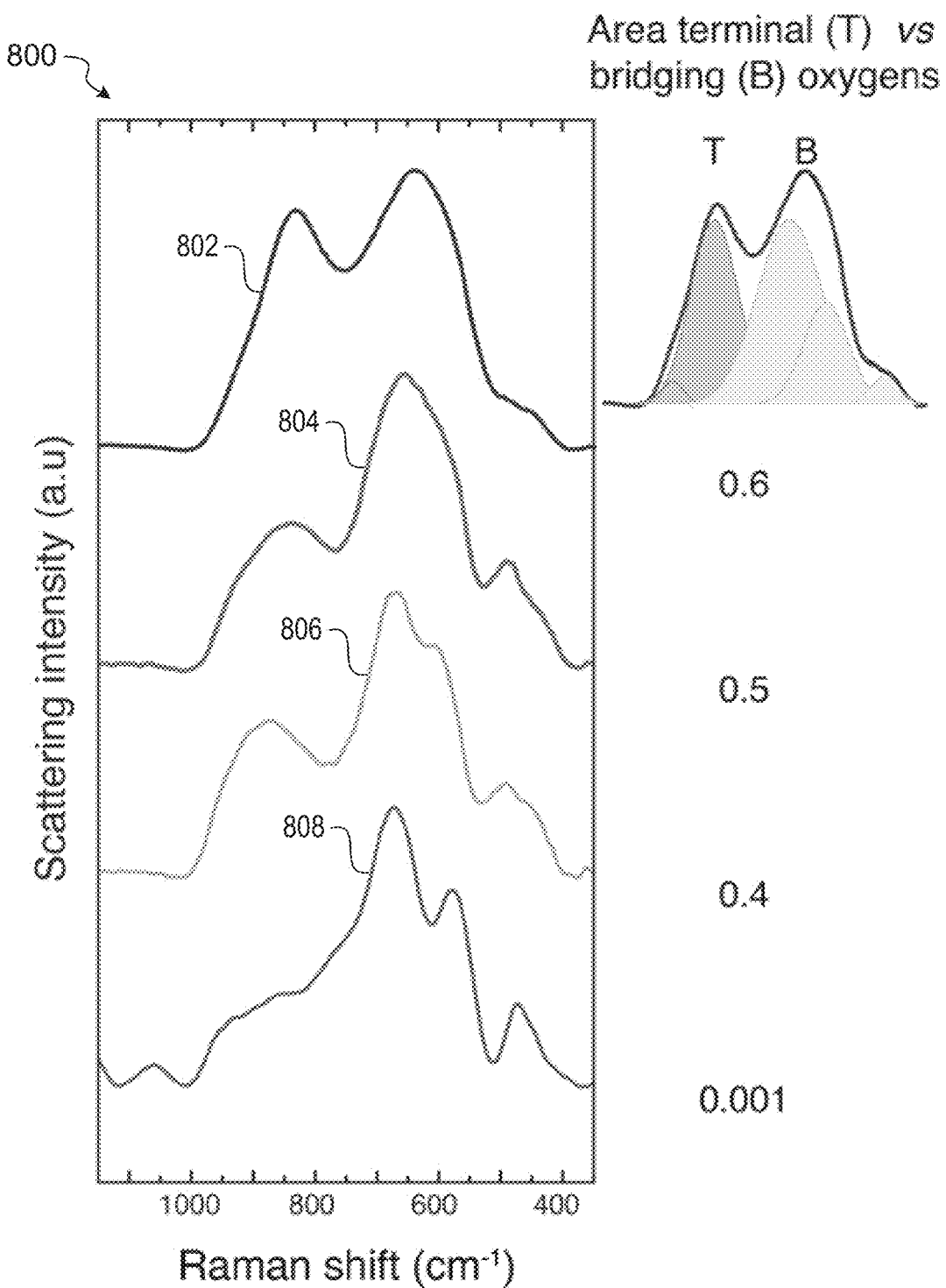
FIG. 8 is a plot of Raman spectra for various chemically-condensed electrochromic films compared to that of a thermally-condensed electrochromic film.

FIG. 8 shows a plot 800 of Raman spectra of chemically-condensed decaniobate films as formed (curve 802), after chemical dehydration (curve 804), and after thermal dehydration (curve 806). A Raman spectrum of a conventional thermally-condensed decaniobate POM film (curve 808) is shown for comparison. Estimated relative area of terminal oxygens (T) versus bridging oxygens (B) was determined by fitting the Raman peaks with Gaussian functions.

Figure 9A:
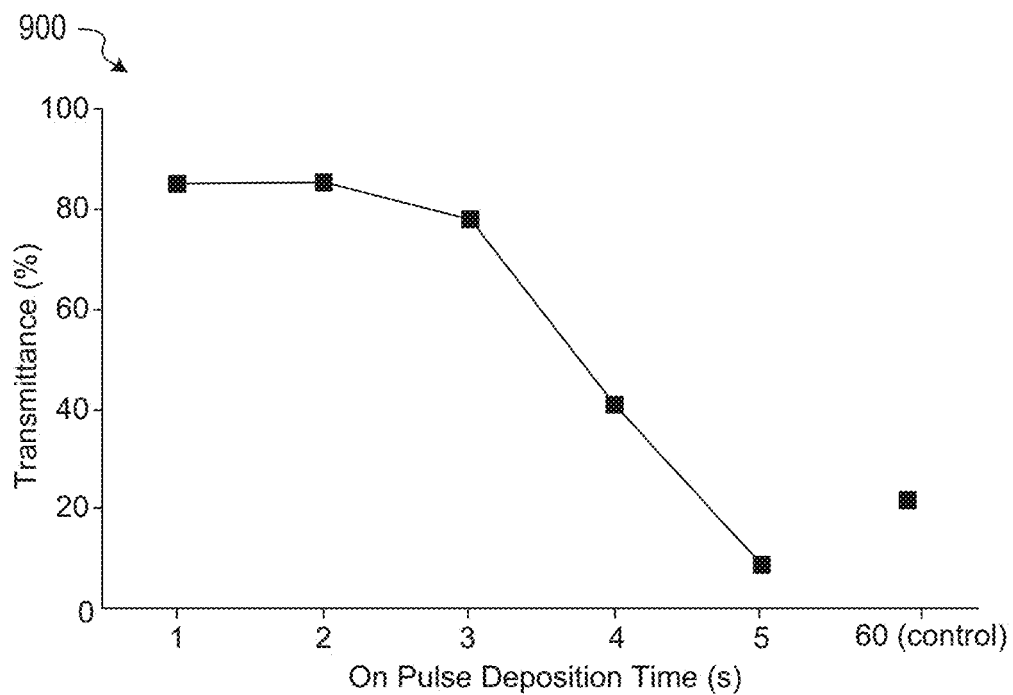
FIG. 9A is a plot of transmittance versus on pulse deposition time for condensed-POM films produced via pulsed electrochemical deposition, according to some embodiments.

FIG. 9A is a plot 900 of transmittance versus on pulse deposition time for condensed-POM films produced via pulsed electrochemical deposition. Different electrochemical pulses were utilized, in which a total time duration of the on pulses (i.e., the cumulative total time for which a non-zero electrochemical potential is applied during the deposition process) was 60 seconds, and a time between the on pulses (i.e., a time duration of the off pulses) was 5 seconds. The magnitude of the on pulses was 2.5 V. It was observed that the resulting condensed film maintained a high transmittance (greater than 70%) up to an on pulse length of 3 seconds, but steadily decreased beyond 3 seconds. A control experiment was also performed with a single on pulse that lasted the duration of the deposition process. Longer exposure to a non-zero potential leads to greater crack formation in the film, which increases the film opacity and the likelihood of the film delaminating from the substrate due to increased film stress.

Figure 9B:
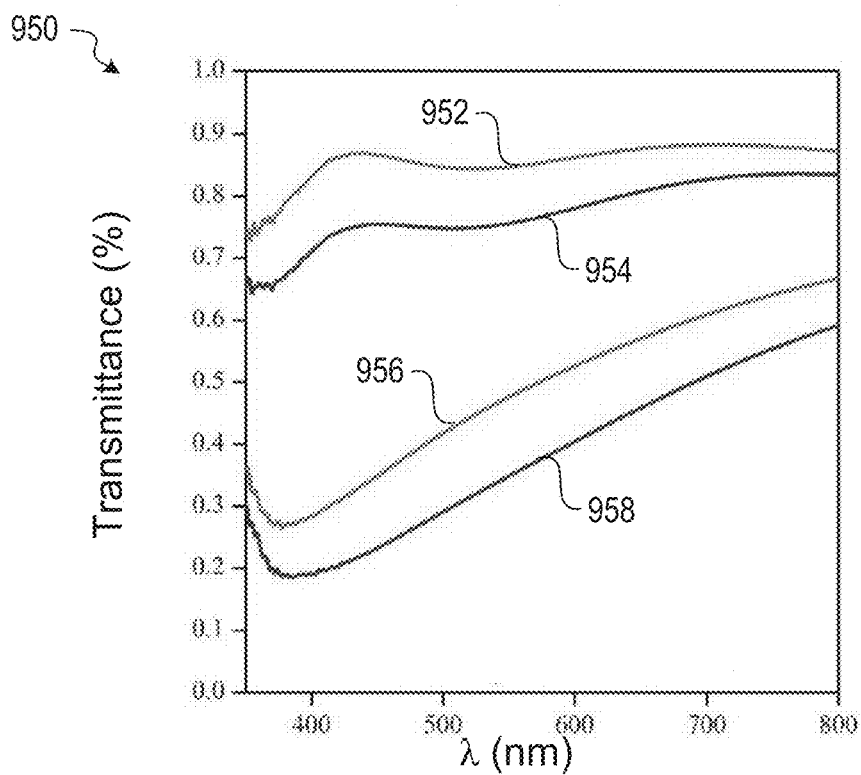
FIG. 9B is a plot of transmission spectra for electrochromic devices having condensed films produced via pulsed and continuous electrochemical potentials, according to some embodiments.

FIG. 9B is a plot 950 of transmission spectra for electrochromic devices having condensed films produced via pulsed and continuous electrochemical potentials. Films were produced by electrochemical deposition of a lithium salt precursor of $Li8[Nb_6O_{19}].15 H_2O$ to produce niobium oxide films. Curves 952 (open circuit potential) and 954 (1.5 V) correspond to a film produced via a pulsed potential, and curves 956 (open circuit potential) and 958 (1.5 V) correspond to a film produced via a continuous potential. Both the pulsed and continuous deposition processes exhibited similar changes in transmittance, however the pulsed process film resulted in a more transparent off state than the continuous process film.

Figure 10A:
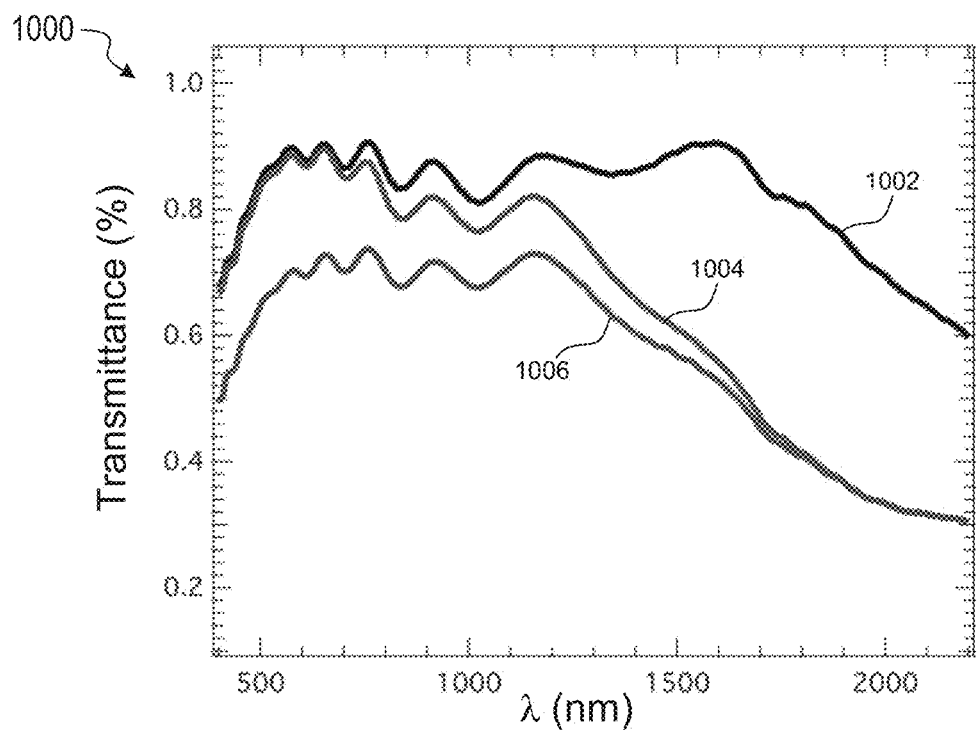
FIG. 10A is a transmittance spectrum for an electrochromic device utilizing an $NbO_x$-ITO composite film enclosed by glass substrates according to one embodiment of the present invention.
Figure 10B:
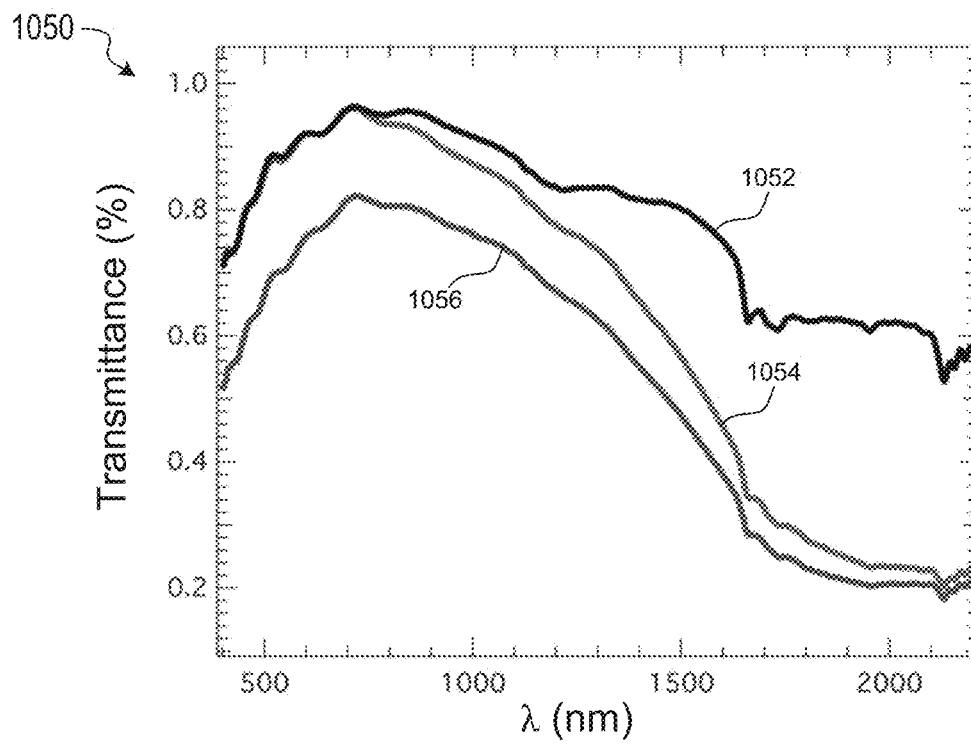
FIG. 10B is a transmittance spectrum for an electrochromic device utilizing an $NbO_x$-ITO composite film enclosed by flexible substrates according to one embodiment of the present invention.

FIGS. 10A and 10B are transmittance spectra for electrochromic devices with glass and flexible substrates, respectively. An electrochromic device was produced (e.g., in a similar manner described with respect to method 500 of FIG. 5) by depositing an NbOx-ITO composite film (prepared via acid curing of a composite POM-film) on a first glass substrate (TEC 70 fluorine-tin-oxide), and depositing a lithium-ion-conducting electrolyte layer on the composite film. The electrolyte layer was a polymer gel electrolyte that included PMMA, LiTFSI, and tetraglyme. A counter electrode film was prepared by depositing $CeO_2$ nanocrystals on a second glass substrate (TEC 70 fluorine-tin-oxide) using a blade coater, and the counter electrode film was annealed at 175° C. for 30 mins. CeO2 was selected as the counter electrode material due to its high charge capacity and broadband optical transparency. The first glass substrate and the second glass substrate were laminated together under vacuum to enclose the NbOx-ITO composite film, the electrolyte layer, and the counter electrode film. FIG. 10A shows a plot 1000 of electrochromic performance for the full device under different applied bias: 2.5 V/5 minutes (curve 1002), −0.5 V/5 minutes (curve 1004), and −2.5 V/30 minutes (1006).

FIG. 10B shows a plot 1050 of electrochromic performance for a flexible device under different applied bias: 2.5 V/5 minutes (curve 1052), −0.5 V/5 minutes (curve 1054), and −2.5 V/30 minutes (1056). The flexible device was prepared in a similar manner as described above, except that flexible polymer substrates (polyethylene terephthalate) were used in lieu of glass substrates. Both of plots 1000 and 1050 demonstrate dual-band optical modulation of electrochromic devices produced according to the embodiments described herein, suggesting the applicability of low-temperature film processing in large-scale roll-to-roll fabrication, which may improve device yield and ultimately reduce overall manufacturing costs.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an embodiment" or "one embodiment" means that a particular feature, structure, or characteristic described in connection with the embodiment is included in at least one embodiment. Thus, the appearances of the phrase "an embodiment" or "one embodiment" in various places throughout this specification are not necessarily all referring to the same embodiment.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   depositing a polyoxometalate (POM) solution onto a substrate to form a POM film, wherein the POM solution comprises anionic POM clusters and counter ions, wherein each of the anionic POM clusters has a composition comprising $[M_xO_y]^{(5x-2y)}$ wherein M is vanadium, niobium, or tantalum, x is an integer having a value ranging from 4 to 36, and y is an integer having a value ranging from 16 to 252;
   chemically curing the POM film with an organic acid solution or vapor, wherein the organic acid solution or vapor consists of an organic acid and a polar solvent, to produce a condensed film, wherein chemically curing the POM film condenses the POM clusters and removes the counter ions; and
   treating the condensed film with a water removal agent comprising at least one of triethyl orthoformate or trifluoroacetic anhydride.

2. The method of claim 1, wherein the counter ions comprise organic counter ions.

3. The method of claim 1, wherein the counter ions comprise inorganic counter ions.

4. The method of claim 1, wherein M is niobium.

5. The method of claim 1, wherein the POM solution further comprises ethanol or water.

6. The method of claim 1, wherein:
   prior to treating the condensed film with the water removal agent, the condensed film has a composition comprising $M_xO_y \cdot nH_2O$; and
   after treating the condensed film with the water removal agent, the condensed film has a composition comprising an network of $M_xO_y$,
   wherein n is an integer value ranging from 1-3.

7. The method of claim 1, wherein at least one of a) the POM film is formed at a temperature from 10° C. to 200° C., or b) the POM film is chemically cured at a temperature from 10° C. to 200° C.

8. The method of claim 1, wherein the POM film is chemically cured at room temperature.

9. The method of claim 1, wherein the organic acid is at least one of formic acid, acetic acid, trifluoroacetic acid, citric acid, oxalic acid, uric acid, lactic acid, benzoic acid, fumaric acid, succinic acid, tartaric acid, maleic acid, ascorbic acid, propionic acid, butyric acid, sorbic acid, or tartaric acid.

10. The method of claim 1, wherein the polar solvent is ethanol, acetonitrile, or a combination thereof.

11. The method of claim 1, wherein the POM solution further comprises near-infrared (NIR) plasmonic nanocrystals, wherein the NIR plasmonic nanocrystals comprise at least one of tin-doped indium oxide (ITO), aluminum-doped zinc oxide (AZO), indium-doped zinc oxide (IZO), gallium-doped zinc oxide (GZO), zinc and tin-doped indium oxide (ZITO), fluorine-doped tin oxide (FTO), indium-doped cadmium oxide (CdO:In), alkali or lanthanide metal-doped tungsten oxide ($M_xWO_3$), or vacancy-doped tungsten oxide ($WO_{3-x}$).

12. The method of claim 1, further comprising producing an electrochromic device using the treated condensed film.

* * * * *